Nov. 18, 1952 — W. A. FLUMERFELT — 2,618,049
METHOD OF MAKING UNIVERSAL JOINTS
Original Filed July 19, 1947 — 2 SHEETS—SHEET 2
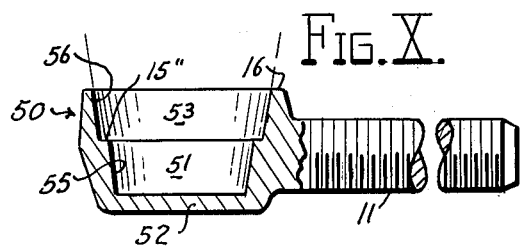
Fig. X.
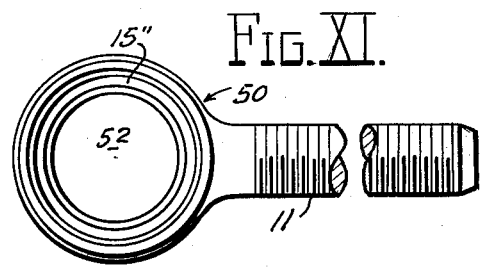
Fig. XI.
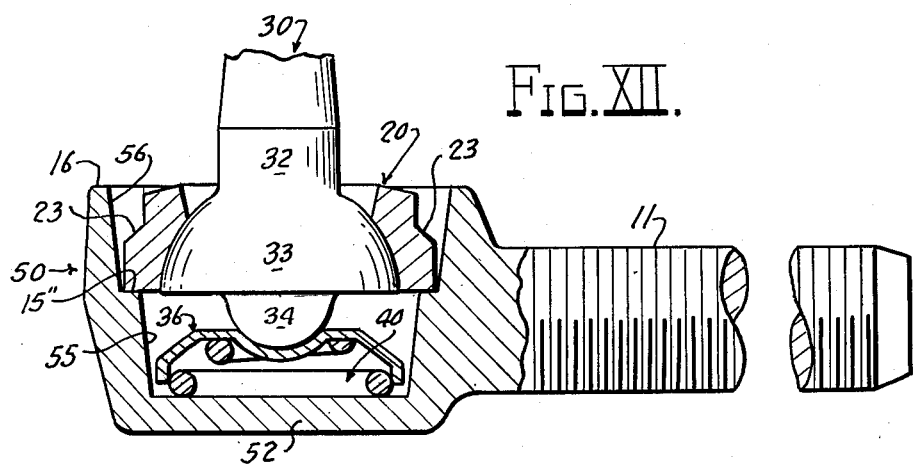
Fig. XII.
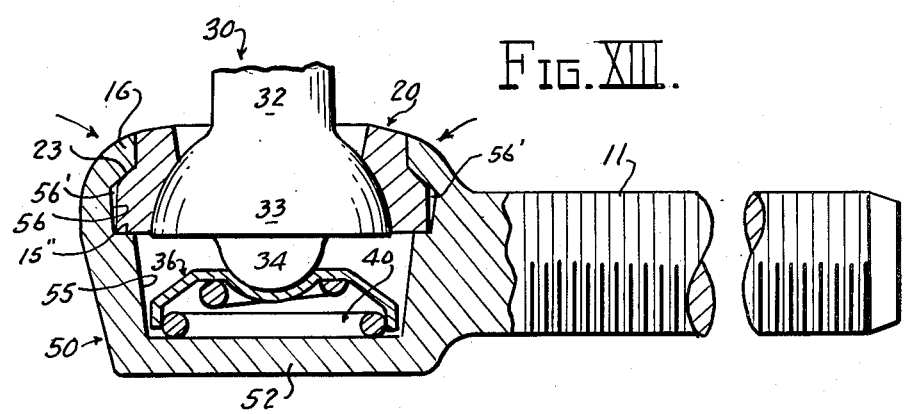
Fig. XIII.
INVENTOR.
William A. Flumerfelt
BY Edmund B. Whitcomb
ATTORNEY Patented Nov. 18, 1952

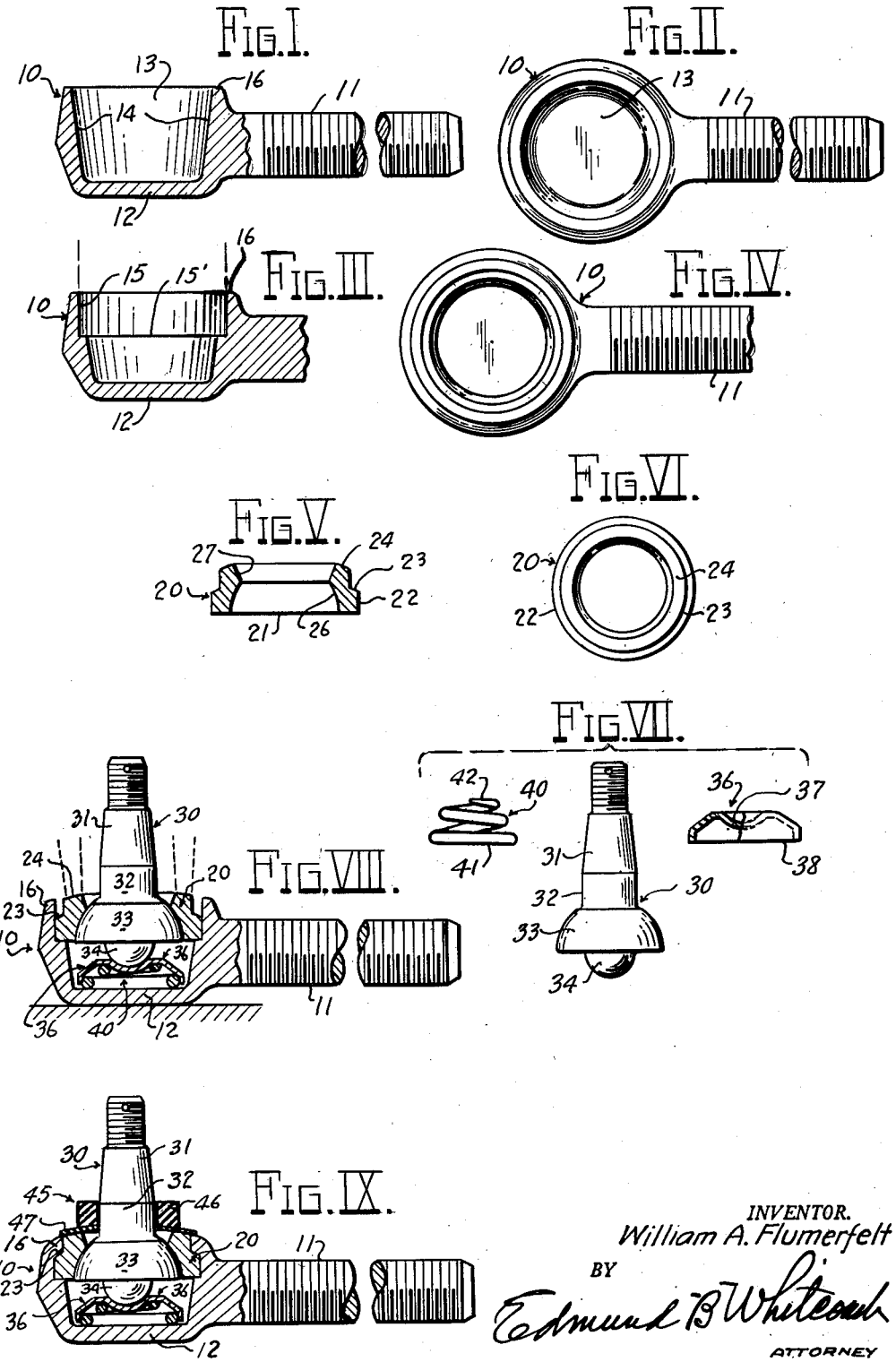

2,618,049

UNITED STATES PATENT OFFICE 2,618,049

METHOD OF MAKING UNIVERSAL JOINTS

William A. Flumerfelt, Columbus, Ohio, assignor to The Columbus Auto Parts Company, Columbus, Ohio, a corporation of Ohio Original application July 19, 1947, Serial No. 762,075. Divided and this application February 21, 1950, Serial No. 145,560

2 Claims. (Cl. 29—148)

This invention relates to an improved method in the making, forming, processing and assembling individual parts in an assembled mechanical unit such as a universal joint to reduce cost and effect a completed construction which in quantity production may be held to extremely accurate specifications and at the same time providing an efficiently operating assembling unit.

The objects of the present invention include the various steps and improved method of joint construction and assembly, which includes forming a housing by a drop forging process producing a natural flare incidental to the forging, forming a blind solid closed end to the housing piece; leaving an unfinished portion in the inner socket wall and arranging the inner part of the socket so as to provide for means to receive the other parts of the joint and leaving the housing unhardened; the next step in the process includes providing a one-piece ring-shaped ball seat unit quite uniform in cross-sectional area so that in quantity production these units may be hardened in bulk with a minimum of distortion and which, if necessary, can be corrected for dimensional hardening changes by merely re-striking in a press. The further steps of the process include assembling any one of a plurality of ring seats in place with a hardened universal ball and stud properly seated with the ball in the inner surface of the hardened ring, the lower inside unfinished part of the housing forming means to receive a supporting pivotal bearing for an integral pivot on the stud together with an expanding take up spring, the final step involving closing the upstanding rim on the forged housing around the inserted hardened seat unit over a ledge on the latter to securely retain the entire unit in place in the socket.

This application is a division of my copending application, Serial No. 762,075, filed July 19, 1947 for "Ball and Socket Assembly," now Patent No. 2,516,688 and further objects and advantages are within the scope of this invention as will appear from a consideration of the specification and drawings of certain forms of the invention, one of which may be preferred, in which:

Figure I is a vertical view, partly in section of the one-piece housing before being bored to receive the seat member;

Figure II is a plan view of the housing shown in Figure I;

Figure III is a vertical view partly in section of the one-piece housing after boring to provide a cylindrical opening therein;

Figure IV is a plan view of the housing shown in Figure III;

Figure V is a sectional elevation of the ring-shaped ball seat member;

Figure VI is a plan of the ball seat member shown in Figure V;

Figure VII shows in elevation (part section) of a group of the remaining elements of the assembly, namely, the ball stud member, the spring and the spring seat;

Figure VIII is an elevation partly in section showing the members of the joint in assembled location before locking them in final assembled position;

Figure IX is an elevation similar to Figure VIII but with the members locked in final assembled position by bending down housing rim;

Figure X is a vertical view partly in section showing an alternate form of the housing member before assembly;

Figure XI is a plan view of the housing shown in Figure X;

Figure XII is an enlarged elevation partly in section showing the assembly of the joint using the housing of Figure X before locking in final assembled position; and Figure XIII is an enlarged elevation similar to Figure XII with the members locked in final assembled position by bending down housing rim.

Referring to the embodiment illustrated in Figures I and IX, 10 represents the one-piece drop forged socket housing having an integral tenon 11 screw threaded for connection with a tie rod. The socket or housing 10 has a closed bottom or blind end 12; and as shown in Figure I, the receiving cavity 13 of the housing has tapered walls 14 allowing for the natural draft of the forging dies. As the piece comes from the forging in this embodiment, this taper extends to the top of the forging, and it is only necessary for me to machine a cylindrical wall 15 extending from the top of the housing 10 to about midway of the cavity 13 as indicated in Figure III. This provides a ledge 15' on said inner socket wall and at the top end, there is an upper lip or rim 16 on the housing 10 which, as will be hereinafter pointed out, is spun closed around the ball seat to hold the latter in place in assembling the joint.

A separate ball seat being used, no part of the housing need be hardened or provided with a hardened surface and in view of the fact, for example, that the socket is not coined or otherwise finished to give a hard surface and sufficient clearance for the internal parts of the joint are provided, normal forging variations encountered in practice may be disregarded and variations in metal volume are also of no consequence.

Referring to Figures V and VI, I show the hardened ball seat unit 20 detached from the joint. This ball seat consists of a ring 20 having a flat bottom face 21, an outside cylindrical wall 22 (to fit the wall 15 of the housing 10), a ledge 23, and an inclined top face 24 for its outside configuration. The inside configuration of the ball seat ring 20 includes the accurately formed, spherically shaped surface 26 extending from the bottom rim 21 to an outwardly flared enlargement or neck portion 27, the latter to permit shifting of the shank of the ball stud in use.

The ball seat 20 is separately hardened before assembly and in view of the fact that it is relatively small and of substantially uniform cross section, these units may be hardened in bulk with a minimum of distortion, and any corrections necessary may be effected by a simple procedure as by restriking in a press, for example. By providing a separate ring-shaped ball seat 20, as shown in Figures V and VI, I avoid the necessity of attempting to make a hardened (coined) seat in the wall of the housing 10 itself.

The hardened ball and ball stud unit 30 shown in Figure VII includes the shank 31, neck 32, and spherically-shaped ball portion 33.

In the embodiments of my invention herein shown, I provide the lower extremity of the ball 33 with a pivotal smaller bearing extension 34, forming an end bearing for the stud or a pivot for the oscillation of the stud in use, the stud also oscillating at this point. Of course, the stud unit 30 is hardened and finished to an accurate spherical configuration to provide a close initial fit between the hardened ball seat 20 and the ball, thereby assuring that wear between these meeting parts will be held to a minimum.

A sheet metal spring seat 36 (Figure VII) is depressed, as indicated at 37, to receive the pivotal extension bearing 34 at the end of the ball as shown in Figure VIII. It will be noted that the outside lower edge 38 of the spring seat 36 in the illustration may be spaced from the inner lower part of the wall 14 at the lower portion of the cavity 13 in the socket 10 and that variations in forging tolerances of this portion of the socket may occur in quantity production and the parts of the joint may be properly assembled as hereinafter pointed out without requiring an accurate fit of the parts.

Interposed between the closed bottom or blind end 12 of the socket 10 is the coil spring 40, the latter being coiled in a conical manner so as to provide an extended base 41 resting or supported on the inside of the bottom 12 of the housing 10. The spring 40 has a smaller terminal 42 at the upper end to contact the underside of the spring sheet metal 36 circumferentially adjacent the depression 37 which receives on its other side the pivotal ball seat extension 34 above referred to.

In assembly, it will be seen that a spring 40 and spring seat 36 are first located on the bottom or blind end 12 of a socket 10, whereupon a ball seat 20 combined with a ball and ball stud 30 is inserted until the pivot 34 seats in the sheet metal spring seat 37. Then the upper lip 16 on the outside of the housing 10 is spun around the ledge or notch 23 in the ring 20 to securely hold all parts of the joint in assembled position as indicated in Figure IX with the spring 40 under the desired amount of compression. By this construction an important feature is that no separate closing washer is needed at the lower end of housing 10 because of the integral closed or blind end 12.

A dust guard 45 has a collar 46 fitting over the neck 32 of the ball stud and a metal flange or apron 47 located below said collar and extending over the top edge 24 of the ball seat 20 and the spun over end 16 of the housing 10.

In the embodiment shown in Figures X to XIII, the housing 50 is forged with a frusto-conical lower cavity 51 adjacent the blind end 52, and simultaneously forming an enlarged frusto-conical upper portion or extension 53 thereof adjacent the open end, thereby providing an annular ledge 15'' at the juncture of these openings during the forging operation.

The wall of the lower cavity 51, as indicated at 55, is sloped at the normal draft angle for forging and this angle is also maintained on the wall 56 of the upper cavity 53.

The other parts of the joint illustrated in the embodiment of Figures X to XIII are similar to those described above in connection with the embodiment illustrated in Figures I to IX, and it will be seen that in this embodiment the slope of the wall 56 of the upper portion of the cavity is inclined but, since the rim 16 is spun around the seat 20 after the assembly is illustrated in Figure XII to hold the parts in position as shown in Figure XIII, the fact that there is a slight space 56' is of no importance. By the method involved in my embodiment in Figures X to XIII it will be thus seen that the boring of the cylindrical wall 15 of the first embodiment is rendered unnecessary in the embodiment of Figures X to XIII.

In each embodiment, it will be seen that any of the component parts of the universal joint may be picked from the plurality of such component parts produced in batches to certain specified tolerances and a single joint made up in which all the parts will properly fit together without requiring any special fitting. Hence, quantity production in large numbers of accurate joints is greatly facilitated.

It is apparent that, within the scope of the invention, modifications and different arrangements may be made other than is herein disclosed, and the present disclosure is illustrative merely, the invention comprehending all variations thereof.

What I claim is:

1. A method of constructing a multiple piece universal joint assembly comprising providing a blank for a one-piece unhardened socket housing; drop forging a socket in said member with one integrally closed end and simultaneously forming an open end with a circular narrow rim thereon leaving the inside wall of the socket with a natural draft of a conical configuration and forming a seat supporting ledge in the inner wall of said socket, leaving unfinished the socket adjacent the closed end; forming a separate ring-shaped insert adapted to form a ball seat, said insert having a spherically-shaped inner surface and two offset outer surfaces, one of larger diameter than the other to thereby simultaneously form an interconnecting ledge between said outside surfaces, making the portion of the larger diameter to telescope within the inner housing wall; hardening said ring-shaped insert prior to insertion into the socket; providing a ball and stud unit with a spherically-shaped ball part portion and hardening the same; providing an expanding spring and inserting the same through the open end of said socket to contact the closed end; then inserting said ring seat in said housing with a ball and stud located inside said ring until one edge of said ring rests against said ledge on the inner wall of said socket; and spinning said rim located at the open end of said housing over said ledge on said ring to clamp said ring between said ledge on the ring and said ledge in the socket and to simultaneously permanently position said expandable spring under compression in said joint.

2. A method of constructing a multiple piece universal joint assembly comprising providing a blank for a one-piece unhardened socket housing; drop forging a socket in said member leaving one integrally closed end and simultaneously forming an open end with a circular narrow rim portion thereon, said forging operation leaving the inside wall of the socket with a natural draft of a conical configuration; machining the inner wall from the open end inwardly to adjacent the central portion only of said socket to form a cylindrical inner wall for a portion thereof and a seat supporting ledge in the inner wall of said socket and leaving unfinished the remainder of said socket in said housing; providing a separate ring-shaped insert adapted to form a ball seat by forming said insert with a spherically-shaped inner surface and two offset outer surfaces, one larger than the other to thereby simultaneously form an interconnecting ledge between said outside surfaces of said insert and making the portion of the larger diameter to telescope within the cylindrical inner housing wall; hardening said ring-shaped insert; providing a ball and stud unit with a spherically-shaped part ball portion and hardening the same; providing an expanding spring and a spring seat into the closed end of said socket in said housing and then inserting a ring in said housing with a ball and stud located inside said ring by sliding said ring within the cylindrical portion of said inner wall of the housing until one edge of said ring rests against said ledge on the inner wall of said socket; and spinning said rim of said housing over said ledge on said ring to clamp ring between said ledge on the ring and said ledge in the socket and to simultaneously permanently position said spring under compression between the closed end of the socket and the spring seat interposed between the other end of said spring and a part of said stud unit.

WILLIAM A. FLUMERFELT.

REFERENCES CITED

The following references are of record in the file of this patent:

UNITED STATES PATENTS

| Number | Name | Date |
| --- | --- | --- |
| 1,714,661 | Crawford | May 28, 1929 |
| 1,845,697 | Baker | Feb. 16, 1932 |
| 2,009,401 | Hufferd | July 30, 1935 |
| 2,124,034 | Hufferd | July 19, 1938 |
| 2,225,758 | Stein | Dec. 24, 1940 |
| 2,516,688 | Flumerfelt | July 25, 1950 |